(12) United States Patent
Kuo et al.

(10) Patent No.: US 6,404,590 B1
(45) Date of Patent: Jun. 11, 2002

(54) MAGNETIC MEDIA WITH RANDOMLY POSITIONED TEXTURING FEATURES

(75) Inventors: David S. Kuo; Bruno Marchon, both of Palo Alto; Wei H. Yao, Fremont, all of CA (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/381,365

(22) PCT Filed: Mar. 18, 1998

(86) PCT No.: PCT/US98/05340

§ 371 (c)(1),
(2), (4) Date: Jan. 6, 2000

(87) PCT Pub. No.: WO98/41393

PCT Pub. Date: Sep. 24, 1998

Related U.S. Application Data

(60) Provisional application No. 60/041,067, filed on Mar. 18, 1997.

(51) Int. Cl.[7] ................................................. G11B 5/66
(52) U.S. Cl. ..................................................... 360/135
(58) Field of Search ............... 360/135; 428/64.1–64.9, 428/65.1–65.9, 156; 219/121.68; 427/53.1; 364/717

(56) References Cited

U.S. PATENT DOCUMENTS

| | | | | |
|---|---|---|---|---|
| 4,218,749 A | * | 8/1980 | Babaud et al. ............... 364/717 |
| 4,831,244 A | * | 5/1989 | Slafer et al. .................. 245/487 |
| 4,996,622 A | * | 2/1991 | Takatsuki et al. ............ 360/135 |
| 5,108,781 A | * | 4/1992 | Ranjan et al. .............. 427/53.1 |
| 5,388,020 A | * | 2/1995 | Nakamura et al. ........... 360/135 |
| 5,543,203 A | * | 8/1996 | Tani et al. .................... 428/156 |
| 5,582,878 A | * | 12/1996 | Ogawa et al. ............... 427/554 |
| 5,635,269 A | * | 6/1997 | Weir et al. .................. 428/65.3 |
| 5,768,075 A | * | 6/1998 | Bar-Gadda .................... 360/135 |
| 5,825,596 A | * | 10/1998 | Hikosawa et al. ........... 360/135 |
| 5,912,791 A | * | 6/1999 | Sundaram et al. ........... 360/135 |
| 5,949,612 A | * | 9/1999 | Gudeman et al. ......... 360/97.01 |
| 5,958,543 A | * | 9/1999 | Teng et al. ................. 428/65.3 |
| 5,973,894 A | * | 10/1999 | Ohasawa et al. ........... 360/135 |
| 5,976,714 A | * | 11/1999 | Arita et al. ............ 428/694 TR |
| 5,981,902 A | * | 11/1999 | Arita et al. ............. 219/121.68 |
| 5,985,402 A | * | 11/1999 | Nakamura et al. ......... 428/65.3 |
| 6,048,255 A | * | 4/2000 | Kuo et al. ..................... 451/41 |
| 6,071,595 A | * | 6/2000 | Jenson et al. ............... 428/195 |
| 6,108,169 A | * | 8/2000 | Liu et al. .................... 360/135 |

* cited by examiner

*Primary Examiner*—Brian E. Miller
*Assistant Examiner*—Chen Tianjie
(74) *Attorney, Agent, or Firm*—Larkin, Hoffman, Daly & Lindgren, Ltd.; Frederick W. Niebuhr, Esq.

(57) ABSTRACT

A magnetic data storage medium includes a dedicated transducing head contact zone for engaging an air bearing slider, primarily when the disk is stationary. The contact zone is textured with an irregular sequence of spaced apart nodules forming a substantially circumferential, spiral path. The spiral path includes multiple terms that define a uniform radial pitch. The circumferential pitch is irregular, more preferably determined according to pseudo-random function in which the actual spacing intervals vary about a nominal interval, over a range comparable to, but generally less than, the interval. The pseudo-random array can be formed by a texturing process that includes directing a focused laser beam onto the contact zone. The disk is rotated to maintain a constant circumferential speed relative to the laser, and also is translated radially to provide the desired radial pitch. The laser is operated in a continuous wave mode, with an acousto-optic modulator between the laser and disk operated to provide a pseudo-random variance in time intervals between successive laser exposures.

31 Claims, 5 Drawing Sheets

MAGNETIC MEDIA WITH RANDOMLY POSITIONED TEXTURING FEATURES

This application claims the benefit of Provisional Application No. 60/041,067 entitled "Pseudo-Random Laser Texture to Reduce Head-Disc Resonance during Take-off, Landing and/or Flying of the Head", filed Mar. 18, 1997.

BACKGROUND OF THE INVENTION

The present invention relates to texturing of magnetic data storage media, and more particularly to the texturing of dedicated transducing head contact zones of such media to minimize system resonance.

Laser texturing of magnetic disks, particularly over areas designed for contact with data transducing heads, is known to reduce friction and improve wear characteristics as compared to mechanically textured disks. Traditional laser texturing involves focusing a laser beam onto a disk substrate surface at multiple locations, forming at each location a depression surrounded by a raised rim as disclosed in U.S. Pat. No. 5, 062,021 (Ranjan) and U.S. Pat. No. 5,108,781 (Ranjan). An alternative, as disclosed in International Publications No. WO 97/07931 and No. WO 97/43079, is to use a laser beam to form domes or nodules, rather than rims. In some cases, each of the domes is surrounded by a raised rim. The features can have either circular or elliptical profiles.

Collectively, the texturing features form a texture pattern or distribution throughout the head contact zone. A particularly preferred pattern is a spiral, formed by rotating the disk at a controlled angular speed while moving a laser radially with respect to the disk. The laser is pulsed to form the individual texturing features. For example, the disk can be rotated to provide a circumferential speed of about one meter per second. Then, operating the laser at 50,000 pulses per second provides a 20 micron circumferential pitch, i.e. distance between adjacent texturing features. The radial speed of the laser controls the radial pitch or spacing between adjacent turns of the spiral, which also can be about 20 microns.

Although this approach has been highly successful in terms of reducing dynamic friction and improving the wear characteristics of dedicated transducing head contact zones, the regular, repeating pattern of the laser texture features produces strong input excitations based on the fundamental frequency of the circumferential pitch, including higher order harmonics. When the excitation frequencies coincide with natural frequencies of the slider or its gimbal and support system, resonance occurs which results in a high amplitude acoustic energy signal, which can increase the difficulty of determining the glide avalanche breaking point (a disk/transducing head spacing value) and yield a false indication that the disk has failed a glide test.

In addition to their resonance effects, regularly spaced apart texturing features are thought to cause transducing head disturbances by intermittent contact of texturing-feature peaks with the data transducing head during disk accelerations and decelerations. Also, the texturing features contribute to turbulence in the air bearing that supports the transducing head slider during portions of accelerations and decelerations. At close non-contacting proximity of the head, pressure modulation of the air bearing can induce head resonance.

Several previously proposed media texturing alternatives address these difficulties to a degree. For example, the aforementioned International Publication Number WO 97/43079 includes the observation that mechanically textured disks, as compared to laser textured disks, produce less acoustic energy during head take-off and landing. A noise-reducing texturing alternative is discussed therein; namely, rows of rims connected to one another at their ends, as shown in FIG. 15 of the publication. In U.S. patent application Ser. No. 09/381,079 now U.S. Pat. No. 6,229,670, entitled "Low Resonance Texturing of Magnetic Media", filed Mar. 13, 1998, resonance-reducing texturing is disclosed in the form of elongate circumferential ridges, most notably a continuous ridge in the shape of a spiral throughout the transducing head contact region. Although both of these alternatives afford considerable reduction in noise during head take-off and landing, there remains a need for noise-reducing texturing arrangements with substantial spacing between adjacent texturing features. These arrangements frequently are preferred to due to lower manufacturing costs and better potential for producing a uniform roughness throughout the head contact zone.

Therefore, it is an object of the present invention to provide an array of texturing features adapted to impart a desired surface roughness to the dedicated transducing head contact zone of a magnetic recording medium while minimizing undesirable resonant frequency effects.

Another object is to provide a magnetic data storage medium in which a head contact zone has a topography comprised of multiple texturing features in a pseudo-random array with irregular spacing intervals between adjacent texturing features, at least in a selected direction along the storage medium.

A further object is to provide a process for laser texturing a data storage medium by subjecting the storage medium to intermittent exposures according to a pseudo-random sequence of timing intervals between successive exposures, to cause an irregular spacing between adjacent texturizing features.

Yet another object is to provide magnetic data storage media that exhibit the highly favorable dynamic friction and wear characteristics of laser textured media, and further exhibit low resonance interactions with transducing heads and their support structure during head take-offs and landings.

SUMMARY OF THE INVENTION

To achieve these and other objects, there is provided a magnetic data storage medium. The medium includes a substrate body formed of a non-magnetizable material and a magnetizable film disposed over the substrate body. The recording medium has a substantially planar surface including a contact region adapted for a surface engagement with a magnetic data transducing head during accelerations and decelerations of the recording medium in a predetermined direction with respect to the transducing head. Multiple texturing features are formed in the contact region. The features protrude outwardly from a nominal surface plane of the substantially planar surface, and cooperate to define a surface roughness of the contact region. The texturing features are spaced apart from one another and arranged to define an irregular spacing between adjacent texturing features in the predetermined direction.

Preferably the texturing features are arranged to preserve a desired density (or permitted range of densities) as well as to provide irregular spacing. To this end, texturing features can be formed in a sequence in which actual intervals between adjacent features vary about a nominal spacing, and further vary about a range (maximum spacing less the minimum spacing) less than the nominal spacing. The nominal spacing can be selected with the desired feature density in mind. In the most preferred arrangement, spacing intervals occur randomly throughout the permitted range.

Typically the recording medium is a magnetic disk, with an annular contact region. Then, the predetermined direction is circumferential with respect to the disk, and the irregular interval is the circumferential pitch. A psuedo-random texture pattern throughout a head contact region can be formed as a single, spiral sequence of texturing features. The spiral provides essentially circumferential turns, with a selected, preferably constant radial pitch between adjacent turns.

The texturing features preferably are substantially uniform in their degree of extension away from the nominal plane, usually considered in terms of height above a horizontal nominal plane. This imparts a desired uniformity to the surface roughness throughout the contact region. The texturing features, when formed as laser nodules or bumps, are rounded and substantially free of sharp edges, and have heights in the range of about 5–30 nm.

Further in accordance with the invention, there is provided a process for surface texturing a magnetic data storage medium, including:

a. directing a coherent energy beam toward a magnetic storage medium; and b. causing the coherent energy beam to impinge upon a selected surface of the storage medium at a plurality of different locations thereon, altering the topography of the selected surface at each location by forming a texturing feature, while selecting the locations to provide an irregular spacing between adjacent texturing features in at least one predetermined direction along the selected surface.

When the data storage medium is a magnetic disk, texturing involves disk rotation to provide a circumferential velocity, in concert with controlling the rate or frequency of laser exposures. One suitable approach involves rotating the disk to maintain a constant circumferential speed, while varying the timing of laser energy exposure episodes, either by controlling the laser itself or an optical component intermediate to the laser and the disk.

In one preferred texturing arrangement, a laser operated in the CW (continuous wave) mode provides a beam directed through an accousto-optic modulator, controlled by a pseudo-random pulse generator. The result is a pseudo-random sequence of texturing features that corresponds to the pseudo-random timing of the laser exposures. While other alternatives are conceivable, e.g., randomly varied disk rotation, considerably more precision is possible by varying the laser exposure timing rather than disk movement.

A pulse laser, randomly triggered, can be used in lieu of the CW laser and accoustal-optic modulator combination, although it is felt to afford less precision by comparison to the preferred combination.

Thus in accordance with the present invention, the transducing head contact zones of magnetic data storage media can be laser textured to form multiple spaced apart bumps or nodules that provide superior wear and friction characteristics, yet do not produce undesirable resonance effects during the take-offs and landings of transducing heads. A pseudo-random variance in spacing between adjacent texturing features, taken in the direction of medium/head relative movement, is particularly effective in reducing input excitations based on fundamental frequencies and their harmonics resulting in improved media performance.

IN THE DRAWINGS

For a further appreciation of the above and other features and advantages, reference is made to the following detailed description and to the drawings, in which.

DESCRIPTION OF THE PREFERRED EMBODIMENTS

Figure 1:
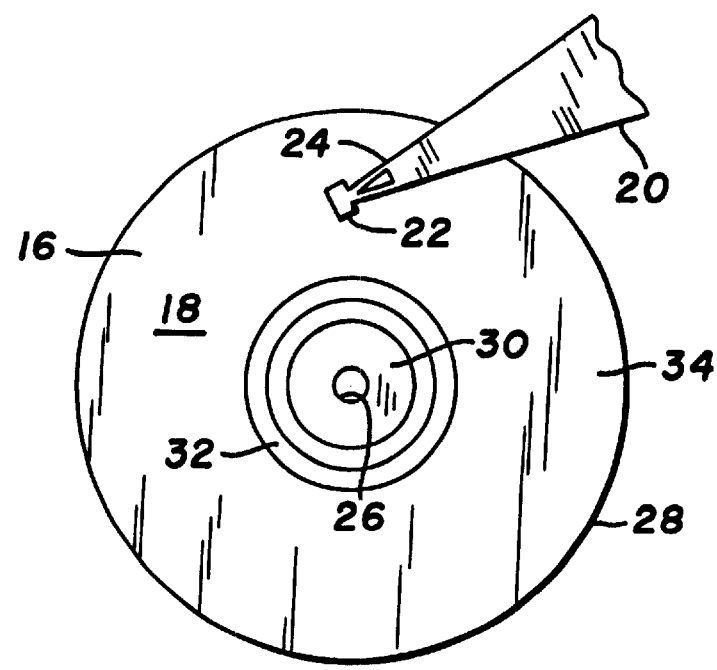
FIG. 1 is a plan view of a magnetic data storage disk having a pseudo-random texture array in accordance with the present invention, and a data transducing head supported for generally radial movement relative to the disk.
Figure 2:
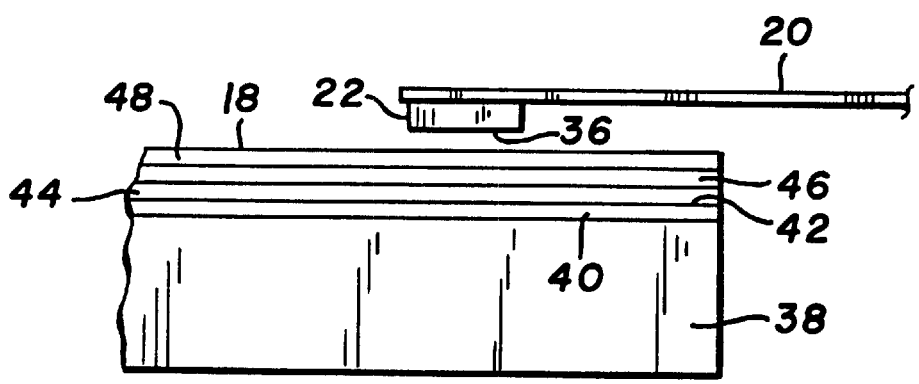
FIG. 2 is an enlarged partial sectional view of the magnetic disk in FIG. 1.

Turning now to the drawings, there is shown in FIGS. 1 and 2 a medium for reading and recording magnetic data, in particular a magnetic disk 16 rotatable about a vertical axis and having a substantially planar horizontal upper surface 18. A rotary actuator (not shown) carries transducing head support arm 20 in cantilevered fashion. A magnetic data transducing head 22 (including magnetic transducer and air bearing slider) is mounted to the free end of the support arm, through a suspension 24 which allows gimballing action of the head, i.e., limited vertical travel and rotation about pitch and roll axes. The rotary actuator and the support arm pivot to move head 22 in an arcuate path, generally radially with respect to the disk.

At the center of disk 22 is an opening to accommodate a disk drive spindle 26 used to rotate the disk. Between the opening and an outer circumferential edge 28 of the disk, upper surface 18 is divided into three annular regions or zones: a radially inward zone 30 used for clamping the disk to the spindle; a dedicated transducing head contact zone 32; and a data storage zone 34 that serves as the area for recording and reading the magnetic data.

When the disk is at rest, or rotating at a speed substantially below its normal operating range, head 22 contacts upper surface 18. When the disk rotates at higher speeds, including normal operating range, an air bearing or cushion is formed by air flowing between the head and upper surface 18 in the direction of disk rotation. The air bearing supports the head above the upper surface. Typically the distance between a planar bottom surface 36 of head 22 and upper surface 18, known as the head "flying height" is about 10 microinches (254 nm) or less. Lower flying heights permit a higher density storage of data.

For data recording and reading operations, rotation of the disk and pivoting of the support arm are controlled in concert to selectively position transducing head 22 near desired locations within data zone 34. Following a data operation, the disk is decelerated and support arm 20 is moved radially inward toward contact zone 32. By the time the disk decelerates sufficiently to allow head/disk contact, the head is positioned over the contact zone. Thus, head contact with other regions of the disk surface is avoided. Before the next data operation, the disk is accelerated, initially with head 22 engaged with disk 16 within the contact zone. Support arm 20 is not pivoted until the head is supported by an air bearing, above the contact zone.

Magnetic disk 16 is formed by mechanically finishing an aluminum substrate disk 38 to provide a substantially flat upper surface. Typically a nickel-phosphorous alloy has been plated onto the upper surface of the substrate disk, to provide a non-magnetizable layer 40 with a uniform thickness in the range of about 2–12 microns. Following plating, the exposed upper surface 42 of the Ni—P alloy layer is polished to a roughness of about 0.1 micro inch (2.54 nm) or less.

After mechanical finishing, substrate surface 42, at least along contact zone 32, is laser textured to provide a desired surface roughness. Laser texturing involves melting the substrate disk at and near surface 42, forming texturing features as will be described in greater detail below.

Fabrication of disk 16 involves the application of several layers after texturing. The first of these is a chrome underlayer 44 with a typical thickness of about 10–100 nm. Next is a magnetic thin film recording layer 46, where the data are stored, typically at a thickness of about 10–50 nm. The final layer is a protective carbon layer 48, in the range of 5–30 nm in thickness. Layers 44, 46 and 48 are substantially uniform in thickness, and thus replicate the texture of substrate surface 42.

Figure 3:
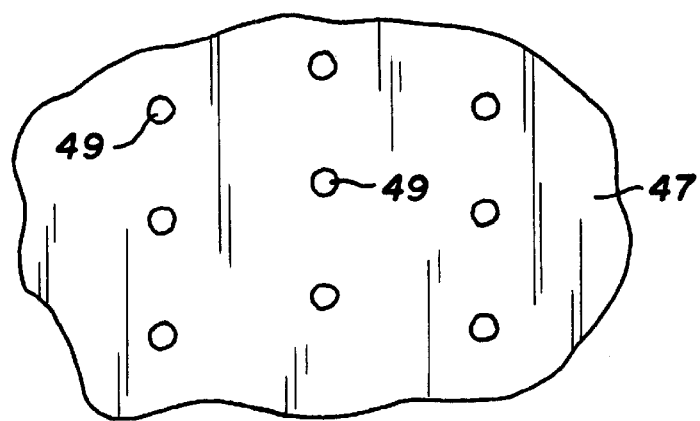
FIG. 3 is a partial top plan view of a magnetic data storage disk with a texture pattern of discrete nodules according to the traditional laser texturing approach.
Figure 4:
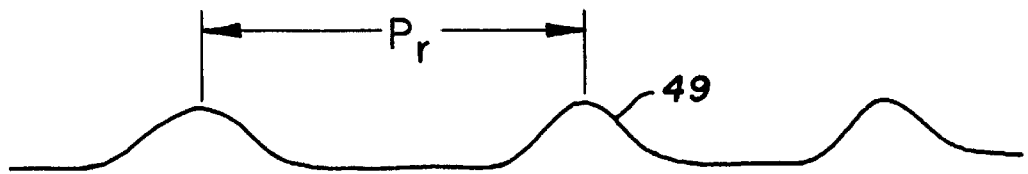
FIG. 4 is a schematic representation of a surface profile of the contact zone in FIG. 3, taken in a circumferential direction.

Laser texturing involves forming discrete nodules (also called bumps or domes) in the substrate disk at surface 42. The size and shape of the nodules depends on the level of laser beam energy impinging upon surface 42. Typically the nodules are formed in a spiral path, having a circumferential pitch governed by the disk rotational speed and laser pulsing interval during texturing. A radial pitch, i.e., the radial distance between consecutive turns of the spiral path, is determined by disk rotation and the rate of radial shifting of the laser relative to the disk. The result of the traditional laser texturing, as seen in FIG. 3, is a disk 47 having a textured head contact zone with a uniform circumferential pitch, i.e., a uniform spacing or distance interval between consecutive nodules 49. The nodules can be formed with a high degree of uniformity in height (distance between the nodule peaks and a nominal surface plane of the disk), typically in the range of about 5–30 nm. This provides a uniform surface roughness, substantially throughout the contact zone. The surface profile view in FIG. 4 illustrates circumferential pitch.

Figure 5:
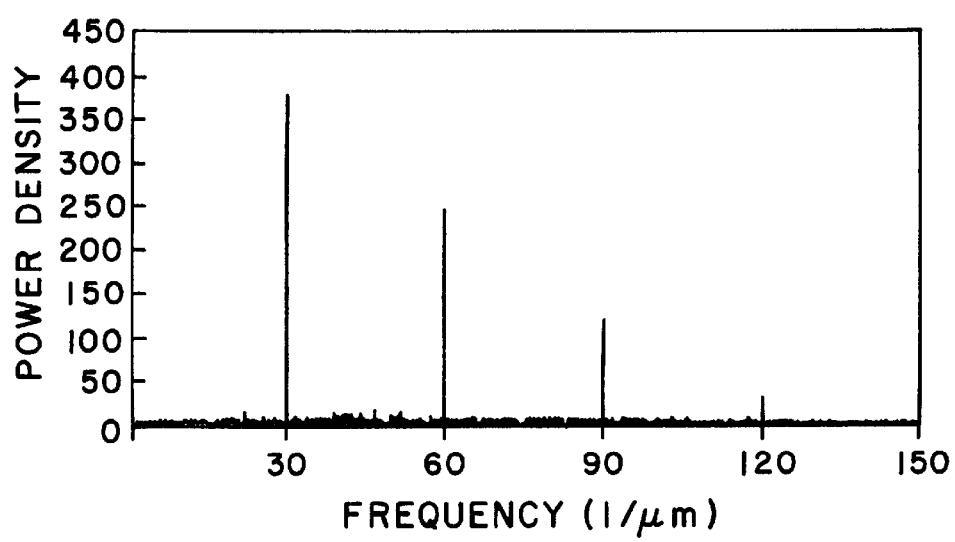
FIG. 5 is a graph showing excitation amplitude as a function of frequency, with respect to the disk of FIG. 3.

This uniformity, however, when coupled with the uniform circumferential pitch, leads to input excitation frequencies that vary linearly with the circumferential speed of the disk relative to the transducing head. During transducing head takeoffs and landings, these input excitation frequencies or their harmonics can coincide with natural resonant frequencies of the transducing head or the head support structure, including the gimbal arrangement that allows adjustments in head orientation about mutually perpendicular pitch and roll axes. The resonance effects are present during glide avalanche measurements, and can provide an erroneous indication that a disk has failed a glide test, and make it difficult to determine the glide avalanche breaking point. The chart in FIG. 5, a plot of amplitudes (dB) with respect to frequencies, illustrate high excitation amplitudes at the fundamental frequency and harmonics, with the magnitude of the spikes decreasing at the higher frequencies.

Figure 6:
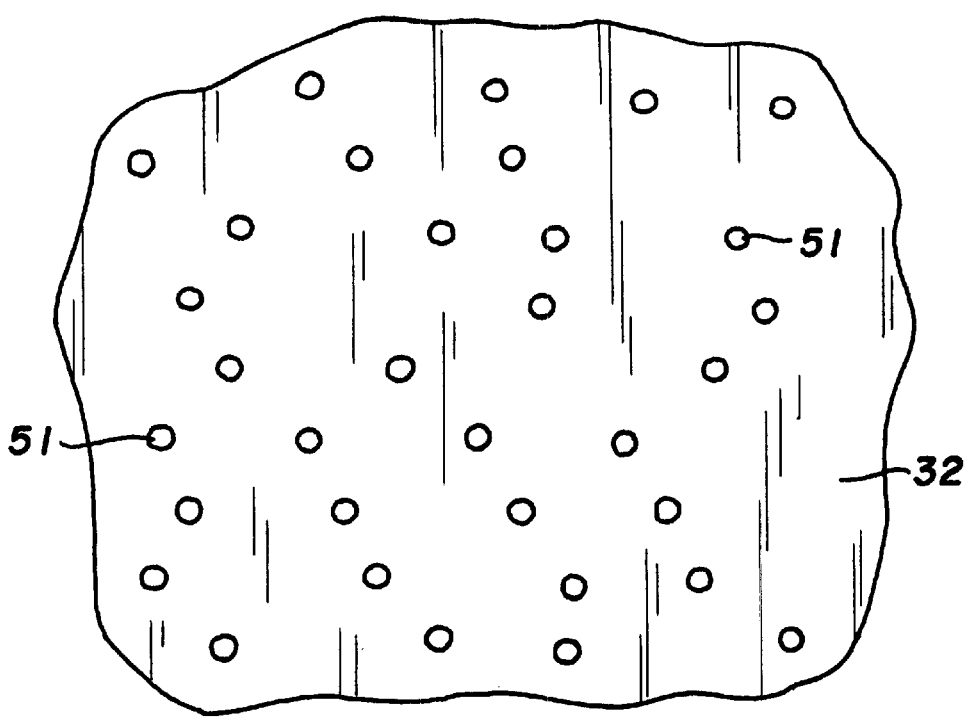
FIG. 6 is an enlarged partial top plan view of the data storage disk shown in FIGS. 1 and 2, showing the textured head contact zone.

FIG. 6 shows an enlarged part of contact zone 32 of disk 16. Nodules 51, actually formed as part of a continuous spiral, appear as a series of horizontal rows that correspond to the circumferential direction. Accordingly, circumferential pitch is represented by the horizontal distances between adjacent nodules 51. The wide variety and random nature of the spacing intervals is readily apparent. In the example illustrated, a pseudo-random texture has a nominal circumferential pitch of 45 microns, and the radial pitch is 25 microns.

Figure 7:
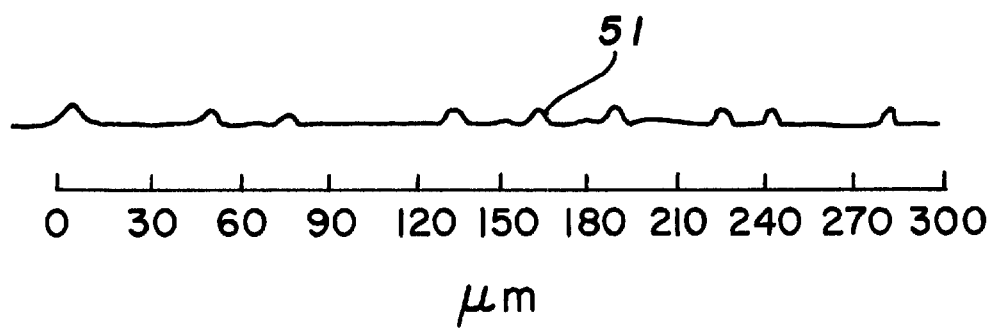
FIG. 7 is a schematic representation of a surface profile of the head contact zone in FIG. 6, taken in a circumferential direction.

In FIG. 7, a surface profile, taken in the circumferential direction along a sequence of nodules, is placed adjacent a scale in microns, to illustrate the irregular nature of between-nodule spacing intervals.

Although the spacing between adjacent nodules is large in comparison to the nodule size (5 micron modual diameters, for example), the inter-nodule spacing, both circumferentially and radially, is minute in comparison to the dimensions of transducing heads, which are typically expressed in millimeters. Nonetheless, to maintain consistent performance in terms of stiction and dynamic friction, it is desirable to maintain a density of nodules 51 at least similar to the density of nodules 49 in the uniform pitch arrangement shown in FIG. 3.

To this end, spacing intervals are varied randomly about a nominal value. According to one example, the nominal circumferential pitch is 50 microns, with spacings varied randomly throughout a range extending from 30 microns to 70 microns, i.e., a 40-micron range. This range, while substantial in comparison to the nominal spacing, is less than the nominal spacing.

Figure 8:
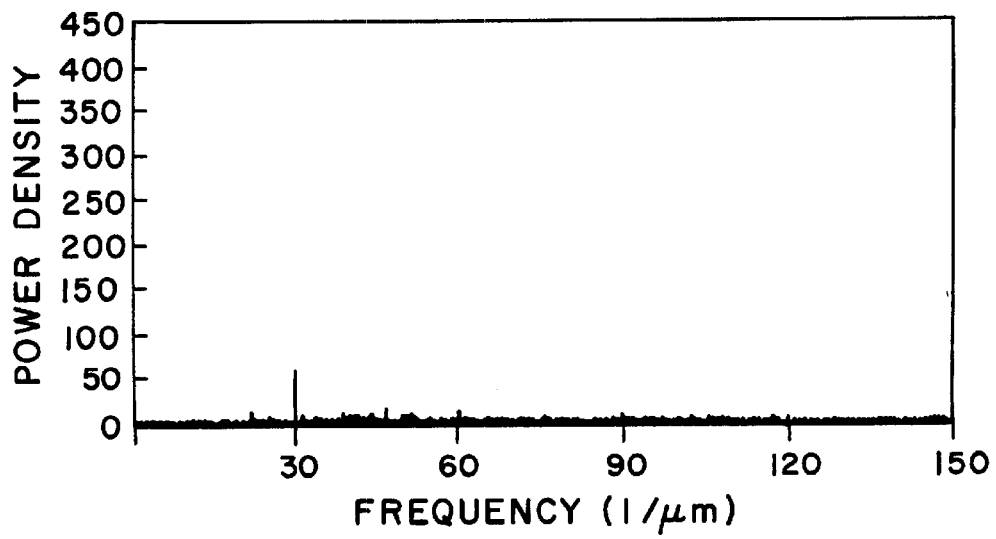
FIG. 8 is a chart showing excitation amplitude as a function of frequency, with respect to the head contact zone in FIG. 6.

The random or otherwise irregular spacing between consecutive nodules substantially reduces the amplitudes of input excitations. As seen from the chart in FIG. 8, which can be compared directly to the chart in FIG. 5 concerning uniform nodule spacing, random spacing yields a low-amplitude spike at 30 kHz. Otherwise, the frequencies are spread out or smeared, i.e., substantially evenly distributed along a range of frequencies. Thus, randomizing the circumferential spacing effectively minimizes the input excitation.

Figure 9:
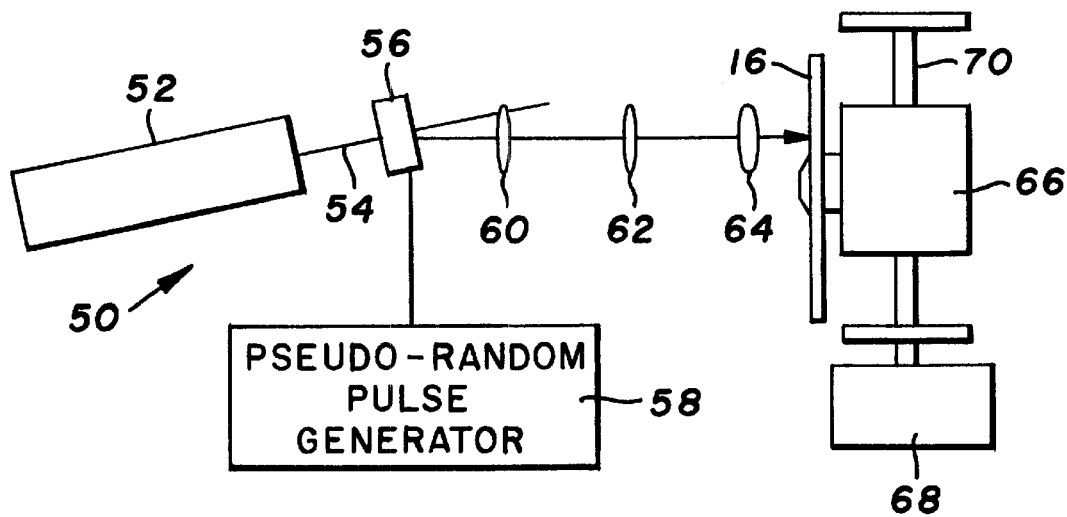
FIG. 9 is a diagramatic view of a texturing system for forming the pseudo-random texture shown in FIG. 6.

FIG. 9 shows a laser texturing device 50 for forming pseudo-random arrays of texturing features in accordance with the presence invention. Device 50 includes an Nd:YVO$_4$ diode laser 52, operated in the CW (continuous wave) mode. A beam 54 generated by laser 52 is provided to an acousto-optic modulator 56, which is controlled by a random pulse generator 58. The pulse generator consists of an arbitrary wave form generator (Tektronic/Sony AWG 2040) and a pulse generator (HP8116A). Beyond modulator 56, beam 54 proceeds through beam columnating and focusing optics, represented by lenses 60, 62 and 64. The beam, emerging from lens 64, is focused on surface 42 of disk 16, at a beam impingement area that typically is circular, but alternatively can have an eliptical or otherwise selectively shaped profile. The diameter of the impingement area can vary with the application and optical components involved.

Focusing the laser energy onto the metallic surface of the substrate disk causes highly localized melting at the surface. Although the material resolidifies rapidly, there is sufficient material flow to form a nodule which projects outwardly, or to the left as viewed in FIG. 9, from the nominal surface plane.

The desired texture pattern or array is formed by rotating disk 16 using a spindle 66, and radially translating the disk relative to the laser beam, e.g., by a motor 68 operating on a shaft 70 to move a non-rotating portion of spindle 66 upwardly and downwardly as viewed in the figure. To trace the preferred spiral path, disk rotation and radial translation occur simultaneously. The degree of radial translation, with respect to disk rotation, determines the radial pitch or distance between adjacent turns of the spiral path.

A substantial departure from previous systems resides in the manner in which successive exposures of the disk to laser energy, i.e., successive nodule formation episodes, are timed.

Conventional laser texturing involves pulsing the laser at a uniform rate or frequency, e.g., 50,000 pulses per second, while maintaining a constant circumferential disk speed, resulting in a uniform circumferential pitch.

In contrast, modulator 56 is controlled to provide a pseudo-random frequency of nodule forming episodes, in which the actual intervals between successive episodes varies about a nominal interval. For example, the interval between episodes (laser exposures) can vary over a range from 15 micro-seconds to 25 micro-seconds, about a nominal interval of 20 micro-seconds.

The intervals between exposures are controlled by modulator 56. More particularly, as controlled by pulse generator 58, modulator 56 either directs beam 54 through the columnating and focusing optics, or diverts the beam as indicated at 54(a). Thus, the modulator acts as a shutter, alternatively allowing and preventing laser exposure. This arrangement affords precise control over the timing intervals, and thus enhances the random nature of the variance in time intervals over the permitted range. As mentioned above, a pseudo-random variance in exposures is preferred. This is accomplished by use of a personal computer to program pulse generator 58 for pseudo-random timing.

Figure 10:
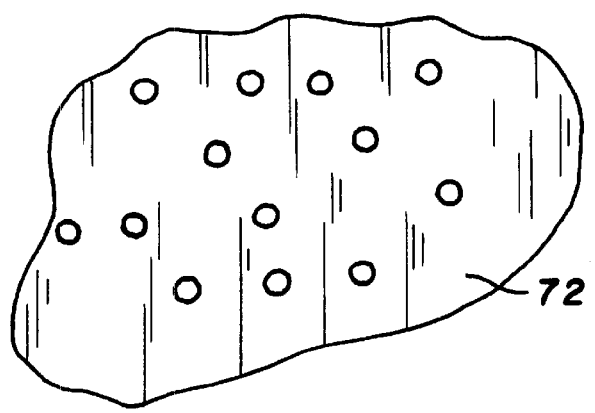
FIG. 10 is a partial top plan view of an alternative data storage disk textured according to the present invention.
Figure 11:
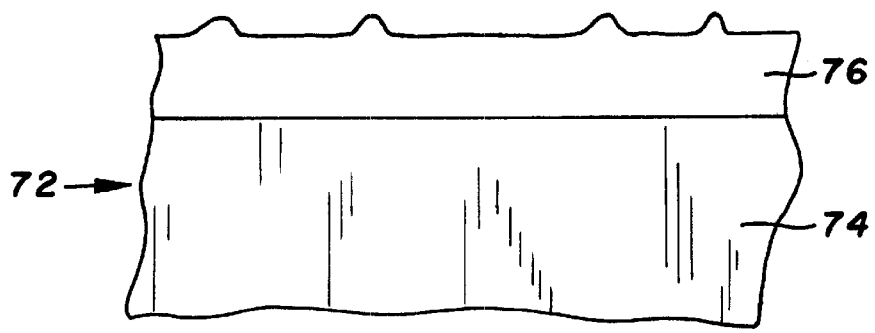
FIG. 11 is a sectional view of the disk in FIG. 10.
Figure 12:
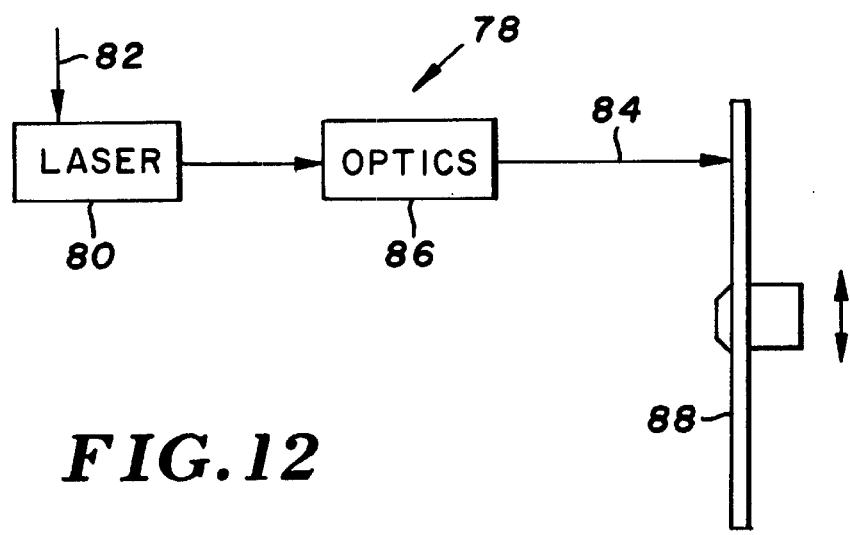
FIG. 12 is a diagramatic view of an alternative embodiment texturing device.

FIGS. 10 and 11 illustrate an alternative embodiment data storage medium 72, in particular a glass ceramic substrate 74 provided with a metallic layer 76, e.g., chromium, sputtered or otherwise deposited onto the glass substrate. The metallic layer is exposed to a CW laser beam pulsed by a modulator while the substrate and metallic layer are rotated and translated radially, to form a texture array along a spiral path as previously described. To ensure that the topography is determined by nodule formation rather than by localized microfracturing, metallic layer 76 should have a thickness of at least about 100 nm FIG. 12 illustrates an alternative embodiment 78 for forming pseudo-random texture patterns. System 78 includes a pulsed diode laser controlled by a trigger signal 82 from a pseudo-random pulse generator (not shown). In response to each trigger, laser 80 generates a beam 84 which proceeds through columnating and focusing optics 86 to a disk 88, which is rotated and radially translated as previously described. This system, although it does not require an acousto-optic modulator, cannot be controlled with the same precision as the system shown in FIG. 9.

Regardless of whether the system in FIG. 9 or the system in FIG. 12 is employed, the preferred approach is to form the sequence of nodules in a spiral path, since the texturing of the entire head contact zone can be completed in one, continuous operation. However, either system can be used to form other pseudo-random arrangements of the texturing features, e.g., a series of concentric rings with a uniform radial pitch and a randomly varied circumferential pitch within the rings.

Thus, in accordance with the present invention, the transducing head contact zones of data storage disks are textured to provide an enhanced surface roughness that improves dynamic friction and wear, yet also virtually eliminates the problem of input excitation frequencies that yield unduly high acoustic energy signals during the take-off and landing of the head slider. This result is achieved by providing a pseudo-random or otherwise irregular arrays of nodules or other textizing features, in particular, sequences in which the spacing between adjacent nodules varies in the circumferential direction. The nodules can be arranged in highly random arrays, yet nonetheless preserve the desired densities for favorable stiction and friction characteristics, for considerably enhanced media performance.

What is claimed is:

1. A magnetic storage medium including:

a non-magnetizable substrate having a substantially planar substrate surface including a selected region for supporting contact of a magnetic data storage medium including the non-magnetizable substrate with a magnetic transducing head during accelerations and decelerations of the substrate in a predetermined direction with respect to the transducing head; and multiple texturing features in the selected region, protruding outwardly from a nominal surface plane of the substrate surface and cooperating to define a surface roughness of the selected region, wherein the texturing features are spaced apart from one another and arranged to define an irregular spacing between adjacent texturing features in the predetermined direction;

wherein intervals of spacing between adjacent texturing features in the predetermined direction vary about a nominal spacing, and over a range (maximum spacing less minimum spacing) less than the nominal spacing.

2. The storage medium of claim 1 wherein:

the substrate is disc shaped, the selected region is annular, and the predetermined direction is circumferential with respect to the substrate.

3. The storage medium of claim 2 wherein:

the texturing features are formed in a single spiral path, and the spacing between adjacent features along the spiral path varies randomly.

4. The storage medium of claim 2 wherein:

the texturing features form multiple circumferential rings radially spaced apart from one another, with a circumferential spacing between adjacent features in each of the rings being randomly varied.

5. The storage medium of claim 1 wherein:

the texturing features are substantially uniform in their height above the nominal plane.

6. The storage medium of claim 1 wherein:

the texturing features have heights above a nominal plane in the range of from about five nanometers to about 30 nanometers.

7. The storage medium of claim 1 wherein:

the texturing features are rounded and substantially free of sharp edges.

8. The storage medium of claim 1 wherein:

the texturing features cooperate to form side-by-side rows, each row extending in the predetermined direction.

9. The storage medium of claim 1 wherein:

the multiple texturing features are spaced apart from one another according to a pseudo-random variance of the spacing.

10. The storage medium of claim 9 wherein:

the nominal spacing is greater than a nominal size of the texturing features by approximately a factor of ten.

11. The storage medium of claim 1 further including:

at least one thin film layer disposed over the substrate surface and defining a substantially planar outer surface including a contact region over the selected region adapted for a surface engagement with the magnetic data transducing head during the accelerations and decelerations of the substrate.

12. The storage medium of claim 11 wherein:

the at least one thin film layer is substantially uniform in thickness whereby the outer surface tends to replicate the substrate surface.

13. The storage medium of claim 11 wherein:

the at least one thin film layer comprises a metallic underlayer disposed over the substantially planar substrate surface, and a magnetic thin film recording layer disposed over the metallic underlayer.

14. A magnetic data storage medium, including:

a non-magnetizable substrate having a substantially planar substrate surface defining a nominal surface plane and including a selected region;

multiple texturing features in the selected region, protruding outwardly from the nominal surface plane and cooperating to define a surface roughness of the selected region, wherein the texturing features are spaced apart from one another to form at least one row of the texturing features extending in a predetermined direction, with an irregular spacing between adjacent texturing features in said at least one row; and at least one thin film layer disposed over the substrate surface and defining a substantially planar outer surface including a contact region over the selected region adapted for a surface engagement with a magnetic data transducing head during accelerations and decelerations of the substrate in said predetermined direction with respect to the transducing head, the thin film layer being substantially uniform thickness whereby the outer surface tends to replicate the substrate surface;

wherein intervals of spacing between adjacent texturing features in the predetermined direction vary about a nominal spacing, and over a range (maximum spacing less minimum spacing) less than the nominal spacing.

15. The medium of claim 14 wherein:

the substrate is disc shaped, tile contact region is annular, and the predetermined direction is circumferential with respect to the substrate.

16. The medium of claim 15 wherein:

the at least one row of texturing features forms a spiral path, and the spacing between adjacent features along the spiral path varies randomly.

17. The medium of claim 15 wherein:

the at least one row of texturing features comprise multiple circumferential rings radially spaced apart from one another, wherein a circumferential spacing between adjacent texturing features in each of the rings is randomly varied.

18. The medium of claim 14 wherein:

the at least one row of texturing features comprises a plurality of said rows extended in the predetermined direction.

19. The medium of claim 14 wherein:

the texturing features are substantially uniform in their height above the nominal surface plane.

20. The medium of claim 14 wherein:

the texturing features have heights above the nominal surface plane in the range of from about five nanometers to about thirty nanometers.

21. The medium of claim 14 wherein:

the texturing features are spaced apart from one another according to a pseudo-random variance of the spacing.

22. The medium of claim 21 wherein:

the nominal spacing is greater than a nominal size of the texturing features by approximately a factor of ten.

23. The medium of claim 14 wherein:

the at least one thin film layer comprises a metallic underlayer disposed over the substrate surface and a magnetic thin film recording layer disposed over the metallic underlayer.

24. The medium of claim 23 wherein:

the at least one thin film layer further comprises a protective carbon layer disposed over the magnetic thin film recording layer.

25. A magnetic data storage device, including:

a non-magnetizable substrate having a substantially planar substrate surface defining a nominal surface plane;

multiple texturing features formed over at least a selected region of the substrate surface and arranged in a plurality of rows extending in a predetermined direction, with an irregular spacing between consecutive texturing features in each of the rows; and a thin film layer disposed over the substrate surface, defining an outer surface that tends to replicate the substrate surface, the outer surface including a contact region over the selected region adapted for surface engagement with a magnetic data transducing head during accelerations and decelerations of the substrate in the predetermined direction with respect to the transducing head;

wherein intervals of spacing between adjacent texturing features in the predetermined direction vary about a nominal spacing, and over a range (maximum spacing less minimum spacing) less than the nominal spacing.

26. The device of claim 25 wherein:

the substrate is disk shaped, the contact region is annular, and the predetermined direction is circumferential with respect to the substrate.

27. The device of claim 26 wherein:

the rows of texturing features form respective portions of a spiral path, and the spacing between the consecutive features along the spiral path varies randomly.

28. The device of claim 26 wherein:

the rows of texturing features comprise respective circumferential rings radially spaced apart from one another, wherein a circumferential spacing between the consecutive texturing features in each of the rings is randomly varied.

29. The device of claim 26 wherein:

adjacent ones of the rows are spaced apart by a substantially constant radial pitch.

30. The device of claim 25 wherein:

the texturing features project outwardly from the nominal surface plane of the substrate surface and cooperate to define a surface roughness of the selected region.

31. The device of claim 30 wherein:

the texturing features are substantially uniform in their height above the nominal surface plane.

* * * * *